J. F. FOX.
HOLLOW AXLE TRUCK.
APPLICATION FILED SEPT. 9, 1920.

1,368,495.

Patented Feb. 15, 1921.

INVENTOR:
John F. Fox
BY
ATTORNEYS.

UNITED STATES PATENT OFFICE.

JOHN F. FOX, OF ST. LOUIS, MISSOURI, ASSIGNOR TO SOUTHERN WHEEL COMPANY, OF ST. LOUIS, MISSOURI, A CORPORATION OF GEORGIA.

HOLLOW-AXLE TRUCK.

1,368,495.  Specification of Letters Patent.  Patented Feb. 15, 1921.

Original application filed April 18, 1919, Serial No. 291,053. Divided and this application filed September 9, 1920. Serial No. 409,161.

*To all whom it may concern:*

Be it known that I, JOHN F. FOX, a citizen of the United States, and a resident of the city of St. Louis, in the State of Missouri, have invented certain new and useful Improvements in Hollow-Axle Trucks, of which the following is a full, clear, and exact description, reference being had to the accompanying drawings, forming part of this specification, which is a division of my application filed April 18, 1919, bearing the Serial Number 291,053.

My invention relates to hollow axle trucks, more particularly of the type wherein the hollow axle is used as a reservoir for grease which flows from the axle to the bearing surface of the wheel hubs by gravity, and preferably also as the result of the pumping action of the wheel hubs which have horizontal play on the axles.

It is the object of my invention to provide a simple, strong and effective construction for devices of this type, wherein more particularly the closure for the end of the hollow axle is of improved nature, and where the thrust of the wheel hubs against the axle boxes is taken care of in an improved manner.

These objects and other advantages which will be noted, I accomplish by that certain construction and arrangement of parts to be hereinafter more specifically pointed out and claimed.

Figure 1:
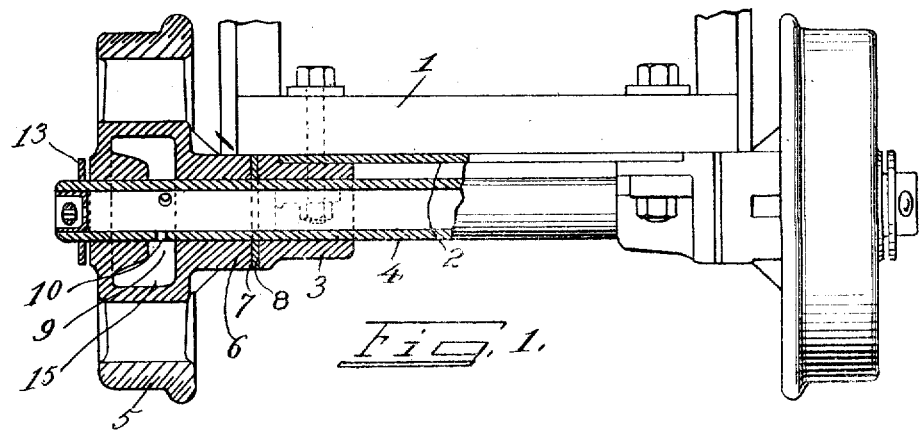
Figure 1 is a view of the new device, partly in front elevation and partly in vertical section.
Figure 2:
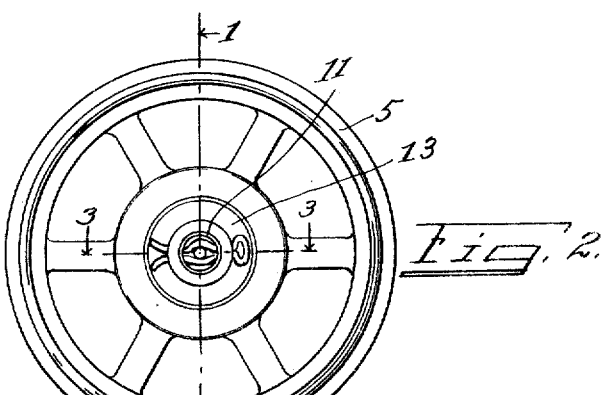
Fig. 2 is an end elevation of one of the hollow axles and wheel, showing the method of securing the axle closing plug in place.
Figure 3:
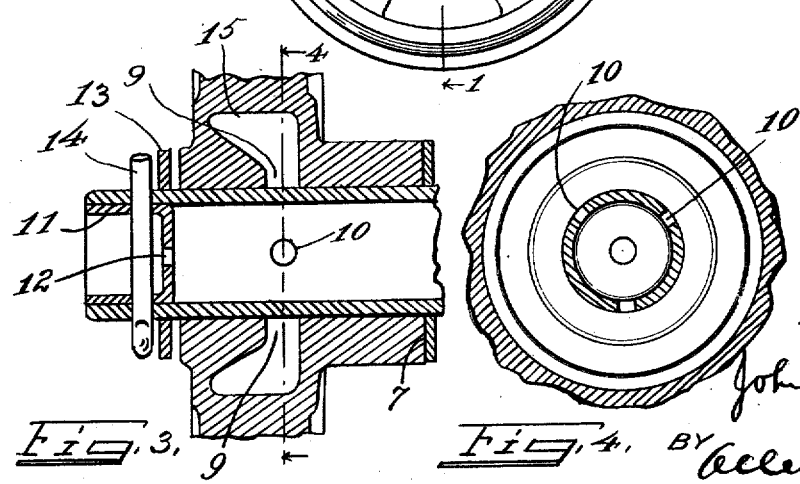
Fig. 3 is an enlarged section on the line 3, 3, of Fig. 2.
Figure 4:
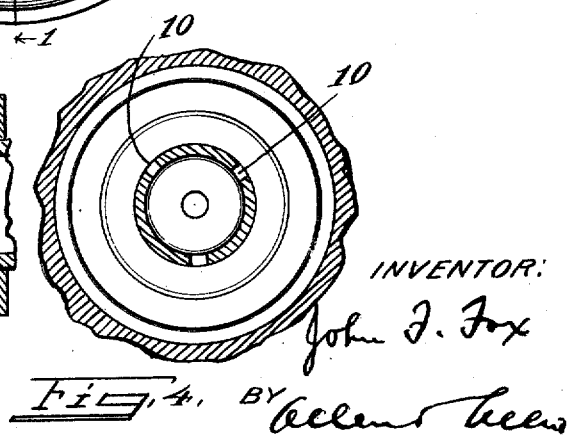
Fig. 4 is an enlarged detail section on the line 4, 4, of Fig. 3.

The truck 1, having a steel bottom plate 2 and axle boxes 3, supports in said axle boxes the hollow axle 4, preferably a cold drawn seamless tube. The wheels 5 having the hubs 6 are mounted over the axle and have the inner faces of these hubs chilled as indicated at 7 in Figs. 1 and 3, and mounted on the axle intermediate the axle boxes and the chill faces 7 of the wheel hubs are hard steel washers 8. These washers together with the chilled inner faces of the hubs form a thrust bearing for the hubs which is practically indestructible. The thrust from the wheels is inwardly toward the axle boxes and the contact of chilled iron to hard steel provided, fully takes care of this thrust. The wheel hubs have grooves 9 cored in their inner faces and the hollow axle is provided with series of interspaced ports 10 which are of less width than the grooves and form a passage whereby grease from the axle can get into the wheel hub grooves.

To close the ends of the hollow axle, steel cup 11 having an orifice 12 in its base is driven into each open end of the axle. A washer 13 is set over the outside of the axle to act as a retainer for the wheel hub and the cup is held in place by a cotter pin 14 inserted through the axle and cup. This cotter pin is spread at the center of the cup to leave a passageway clear for the inserting of an oil or grease gun in orifice 12 in the base of the cup.

It can be seen that this is quite an inexpensive but very desirable manner of closing up the ends of the axle. The washer 13 is preferably adapted to permit of freedom of movement for the wheel hub longitudinally of the axle.

No appreciable amount of oil will be lost through the hole 12 unless the axle is filled nearly half full of oil, and the axle may be filled up to the center with grease, before there is any loss through the said hole. By extending the grooves 9, as shown at 15, I provide a partial reservoir of grease and oil for the wheels without interfering with the lubricating action resulting from the centrifugal drawing out of oil through ports 10 and the pumping action caused by movement of the wheel hubs longitudinally of the axle.

Having thus described my invention, what I claim as new and desire to secure by Letters Patent, is:

1. The combination with a hollow axle for the reception and retention of grease for wheel lubrication, of an end closure for said axles, comprising a member having a central aperture and driven into the end of the axle, and a cotter pin for securing said member in place, said cotter pin being spread to permit of passage of an oil gun into said aperture.

2. The combination with a hollow axle for the reception and retention of grease for wheel lubrication, of an end closure for said axles comprising a cup driven into the end of the axle with its base inward of the axle, and provided with an aperture for the introduction of grease into the axle, and a cotter pin placed through the axle and the cup, said cotter pin spread within the cup to permit the passage of an oil gun to the aperture.

3. In a car truck, the combination with axle boxes, and a hollow axle for the reception of grease, wheels on said axle, grooves in the wheels, and ports in the axles opening into said grooves, said wheels having a mounting on the axles to permit longitudinal play thereon, comprising a washer on the end of the axle, and a cotter pin to retain said washer in place, said pin being so placed and the washer being so proportioned to leave a space greater than the width of the wheel hub between the axle box and the bearing face of said washer.

JOHN F. FOX.